(12) United States Patent
Jin

(10) Patent No.: US 8,373,789 B2
(45) Date of Patent: Feb. 12, 2013

(54) AUTO FOCUS SYSTEM AND AUTO FOCUS METHOD

(75) Inventor: Ju Jin, Austin, TX (US)

(73) Assignee: Ju Jin, Austin, TX (US)

( * ) Notice: Subject to any disclaimer, the term of this patent is extended or adjusted under 35 U.S.C. 154(b) by 317 days.

(21) Appl. No.: 12/658,914

(22) Filed: Feb. 18, 2010

(65) Prior Publication Data

US 2011/0199532 A1 Aug. 18, 2011

(51) Int. Cl.
*G02B 13/16* (2006.01)
*H04N 5/225* (2006.01)

(52) U.S. Cl. ........ 348/335; 348/340; 348/345; 348/348; 348/349

(58) Field of Classification Search .................. 348/335, 348/340, 345, 348; 396/77–81, 89–93
See application file for complete search history.

(56) References Cited

U.S. PATENT DOCUMENTS

| | | | | |
|---|---|---|---|---|
| 5,815,744 A | * | 9/1998 | Ohmiya | .......................... 396/72 |
| 2005/0189419 A1 | * | 9/2005 | Igarashi et al. | ................ 235/454 |

* cited by examiner

*Primary Examiner* — Yogesh Aggarwal

(57) ABSTRACT

An auto focus method for passive auto focus systems consists of an image acquisition and processing engine, as well as an acutance index calculation engine. An auto focus method measures image's acutance index rather than image's contrast value. A passive auto focus system employing the auto focus method of the present invention can accurately and reliably detect the best focus point and thus preventing auto focus malfunction even under the condition that illumination uniformity changes dramatically.

7 Claims, 6 Drawing Sheets

AUTO FOCUS SYSTEM AND AUTO FOCUS METHOD

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

FIELD OF THE INVENTION

The present disclosure relates to automatic focus adjustment of image capturing devices and systems, particularly relates to automatic focus adjustment using proprietary image analyzing techniques.

BACKGROUND OF THE INVENTION

The statements in this section merely provide background information related to the present disclosure and may not constitute prior art.

At present, image capturing devices with auto focus function are widely used in digital still cameras, video cameras, mobile phones, machine vision systems, microscopes, telescopes and many other systems. Auto focus enables image capturing devices to acquire high quality images of an object in an automatic and repeatable manner.

In general auto focus methods can be categorized into two classes: 1) active auto focus method; and 2) passive auto focus method.

Active auto focus systems use separate displacement sensors to measure the distance between the object and the lens, adjusting the lens position based on the measured distance. These displacement sensors can be ultrasonic, laser or infrared sensors.

Compared to passive auto focus systems, active auto focus systems have the following drawbacks. 1) In some biological applications, none of the above sensors can be used, since ultrasonic waves and light ray may damage live cells. 2) Auto focus systems using laser or infrared sensors typically do not work when trying to focus on highly curved surface, since light beam emitted from sensors is reflected off by the surface and does not return back to sensors. 3) Auto focus systems using infrared sensors and ultrasonic sensors will typically not focus through windows, since sound waves and infrared light are reflected by the glass before reaching to an object. 4) Active auto focus systems are typically bulky due to the use of distance measurement sensors. This makes them not suitable for applications with limited space.

Unlike active auto focus systems, passive auto focus systems do not use separate distance measurement sensors to determine the distance between an object and a focusing lens. Instead, they determine the distance by performing analysis of images captured by image capturing devices. Typically passive auto focus can be achieved by phase detection or contrast measurement.

Phase detection auto focus relies on a focus-detection optical system and a plurality of position sensing detectors to determine whether the incoming image is in-focus. The focus-detection optical system and the position sensing detectors are separate from the image capturing optics and the image capturing CCD or CMOS sensor. The focus-detection optics splits incoming light into two separate beams. Based on where these two beams strike it, the position sensing detectors calculate how far out of focus the incoming image is and whether focus is in front of or behind the focal plane. The output of the position sensing detectors is feedback to a controller and the controller activates an auto focus motor to move focus lens to the best focus position. The phase detection calculation is performed in milliseconds and auto focus can be done repeatedly at a very fast rate. This gives an image capturing devices the ability to continually change focus or automatically track a fast-moving object.

The main drawbacks of phase-detection auto focus systems are that they are bulky and more costly to produce since they use additional optics and position sensing detectors.

Contrast measurement auto focus systems perform focus adjustment without using any additional hardware. It uses the same sensor, the image capturing CCD or CMOS sensor, for both auto focus and image capture. Contrast measurement auto focus systems analyze the incoming image and calculate its contrast value. A contrast measurement auto focus system typically starts with the lens at the infinity position and moves step by step to the close end of the focusing range, gauging the contrast to see if it increases or decreases. As the contrast increases, the system knows it is getting closer to an accurate focusing point. At the best focusing point, the contrast reaches a peak. After passing this point, the contrast begins to decrease. Once the system has identified the peak of contrast, the lens is locked down at the corresponding position.

Compared to active auto focus systems and phase detection auto focus systems, contrast measurement auto focus systems have the following advantages. 1) No additional hardware is used. Auto focus can be implemented by software only. This makes the overall image capturing systems less complicated and compact, suitable for applications with limited space. 2) Contrast measurement auto focus systems are more cost effective and flexible, making them a better choice for industrial inspection and measuring systems based on machine vision technology. 3) Contrast measurement auto focus systems are suitable for biological and medical applications, since they do not damage live samples. 4) Focusing performance is not affected by object material. For active auto focus systems, when the object to be imaged is transparent, laser or optical sensors may not function correctly since light passes through the object.

The performance of a contrast measurement auto focus system is largely dependent on the accuracy and reliability of image's contrast measurement. In return, the accuracy and reliability of image's contrast measurement is largely dependent on the image processing algorithms and methods used to evaluate the contrast value. So far, several algorithms have been implemented, including gradient magnitude measurement, Robert edge detector, Sobel edge detector, Laplacian filter, infinite impulse response (IIR) filter.

However, the accuracy and reliability of an image's contrast value measured by the above algorithms can be greatly degraded by the variations of illumination uniformity of incoming images. For example, during focusing on a highly reflective curved surface, the intensity of light rays received by the image capturing CCD or CMOS sensor changes with the distance between the focusing lens and the surface. This results in that some captured images have more bright spots than others. These bright spots will have considerable impact to image's contrast value. As a consequence, image's contrast value may reach the peak while the focusing lens is not at the focus position. This leads to an auto focus system malfunction.

BRIEF SUMMARY OF THE INVENTION

Further areas of applicability will become apparent from the description provided herein. It should be understood that the description and specific examples are intended for purposes of illustration only and are not intended to limit the scope of the present disclosure.

The object of the present invention is to provide a passive auto focus system and an auto focus method which can accurately and reliably measure image's "acutance value" rather than "contrast value" and thus preventing auto focus malfunction even under the condition that illumination uniformity changes dramatically.

The auto focus system of the present invention comprises an image capturing optical unit, an image capturing camera, a control console, a motion controller and a lens driving unit. The control console further consists of an image acquisition and processing engine, an acutance index calculation engine, and a motion control engine.

The auto focus method of the present invention differs from the conventional auto focus methods in that it measures image's acutance index rather than image's contrast value.

BRIEF DESCRIPTION OF THE SEVERAL VIEWS OF THE DRAWINGS

The drawings described herein are for illustration purposes only and are not intended to limit the scope of the present disclosure in any way.

DETAILED DESCRIPTION OF THE INVENTION

Figure 1:
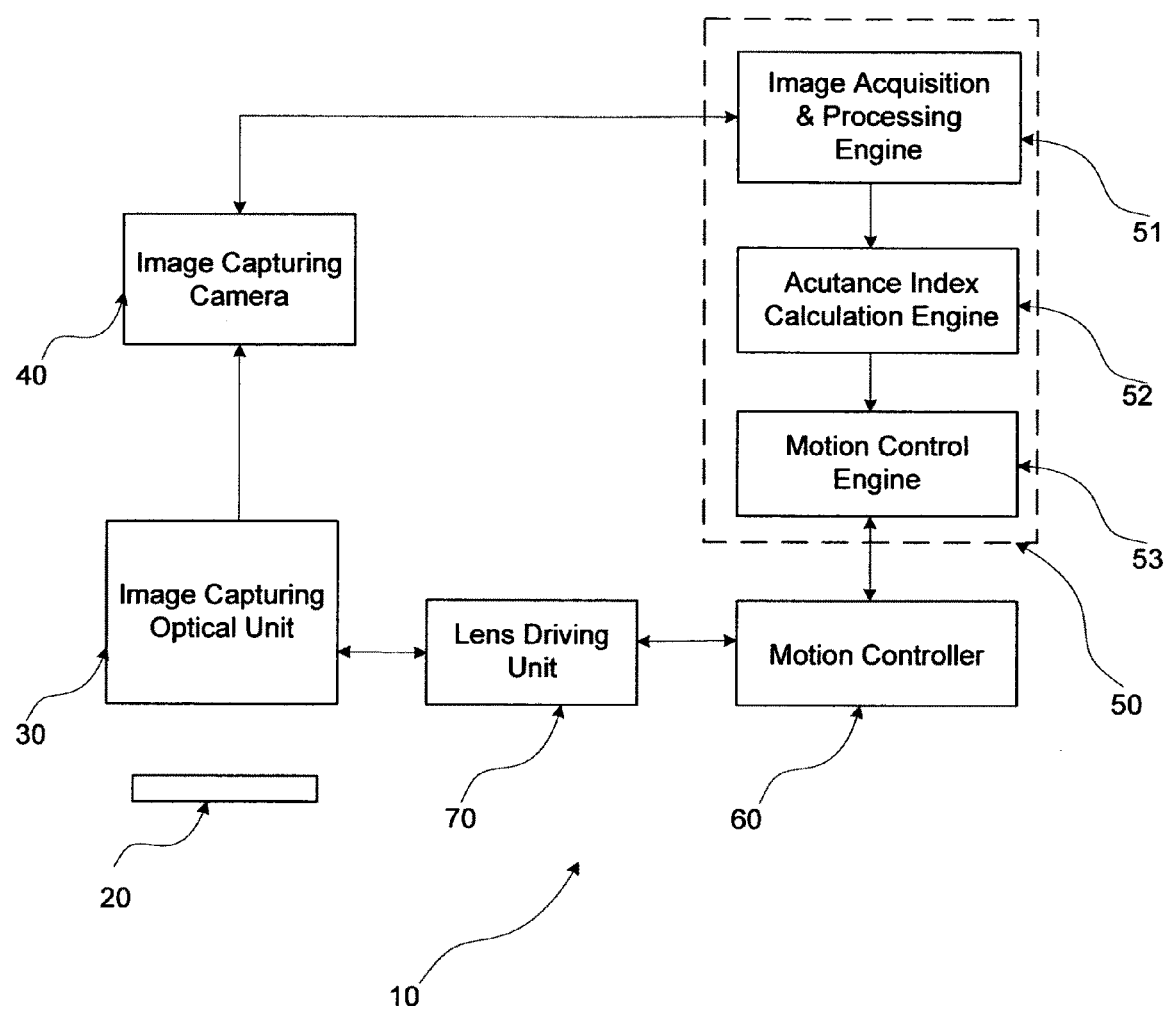
FIG. 1 shows a functional block diagram of an auto focus system of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, an auto focus system 10 consists of an image capturing optical unit 30, an image capturing camera 40, a control console 50, a motion controller 60, and a lens driving unit 70. The control console 50 further comprises an image acquisition and processing engine 51, an acutance index calculation engine 52, and a motion control engine 53.

Referring to FIG. 1, the image capturing optical unit 30 forms optical images of the object 20 onto a CCD or CMOS image sensor inside the image capturing camera 40. The CCD or CMOS image sensor (not shown here) converts the light signal to electric signal. The electronic system (not shown here) embedded in the image capturing camera 40 converts the electrical signal to digital image data with specific pixel format such as Mono8, Mono16, RGB24, Bayer8, Bayer16, YUV411 and YUV422.

The image acquisition and processing engine 51 of the console 50 performs the following functions. 1) First it acquires digital image data from the image capturing camera 40, storing them into the memory of the console 50. 2) Subsequently it applies image processing operations on the incoming image data, preparing an image for acutance index calculation engine.

Figure 2:
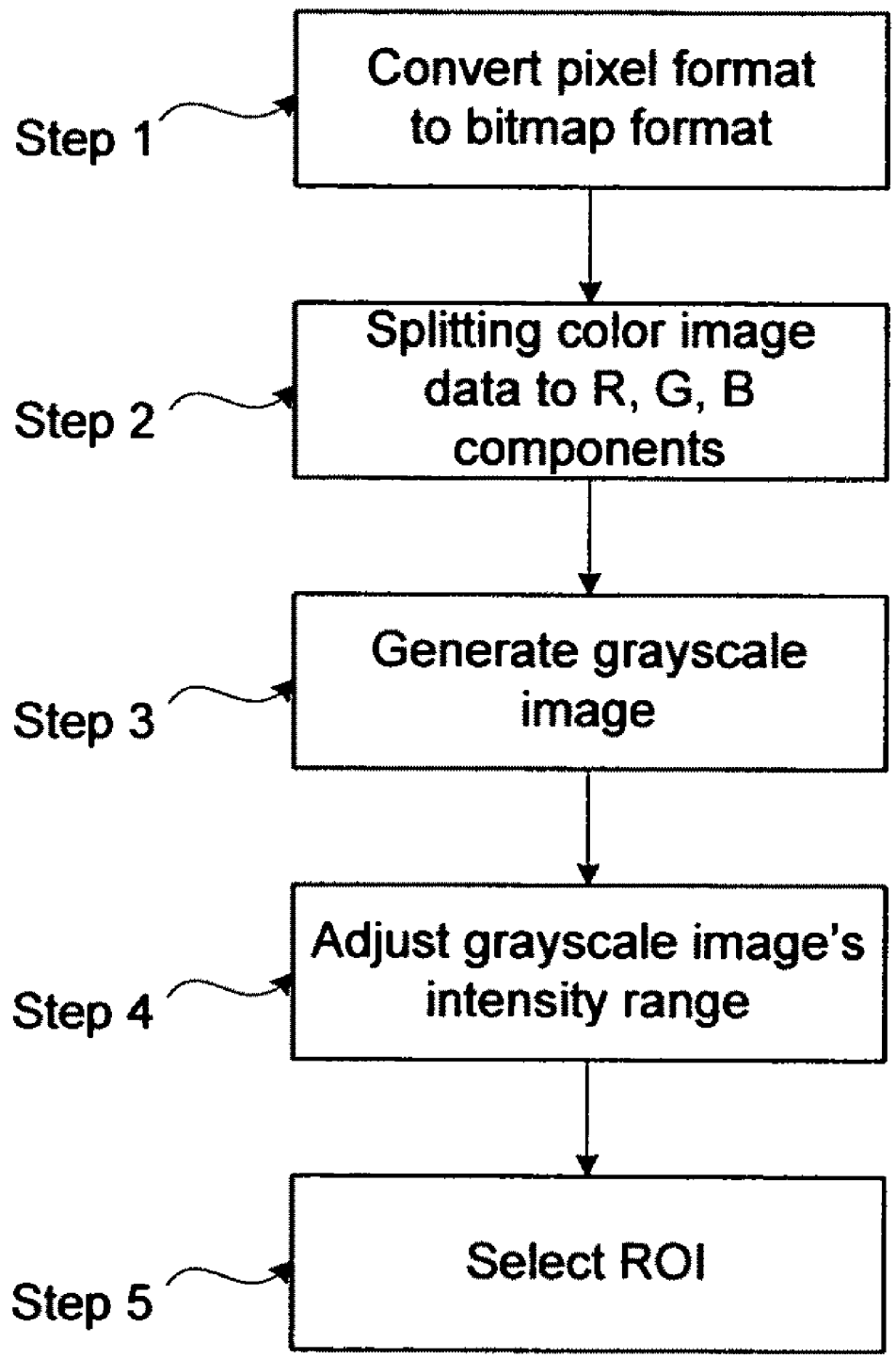
FIG. 2 shows the image processing operations and procedures performed by an image acquisition and processing engine.

Referring to FIG. 2, in more detail, the image acquisition and processing engine 51 applies the following image processing operations on an incoming image. In Step 1, it converts pixel data format to bitmap data format. In Step 2, when the incoming image is a color image, it separates the RGB pixel value to individual red, green and blue pixel values. In Step 3, it generates a grayscale image based on the above red, green and blue pixel values using the following formula:

$$G=a1*R+a2*G+a3*B.$$

Where $0 \leq a1, a2, a3 \leq 1$, and R, G, B are the individual red, green and blue pixel values. In Step 4, it adjusts the intensity range of the grayscale image G created in Step 3, ensuring that every pixel value of image G is within a user-defined range:

$$T1 \leq G \leq T2.$$

Where T1 is the minimum pixel value and T2 is the maximum pixel value. Step 4 removes the darkest spots and brightest spots from the image caused by illumination variations, ensuring the acutance index calculation is immune to illumination uniformity variation. In Step 5, a region of interest (ROI) is cropped from the image G for acutance index calculation. Typically the ROI is smaller than the original image and is a square image with size of two's power, such as 64×64, 128×128 and 256×256.

In case that an image from the image capturing camera 40 is a monochrome image, the Steps 2 and 3 are omitted from the procedure shown in FIG. 2.

Figure 3A:
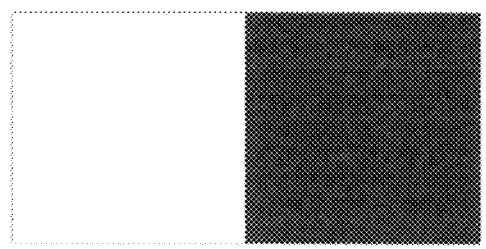
FIG. 3A is a sample image with sharp intensity transition along an edge line.
Figure 3B:
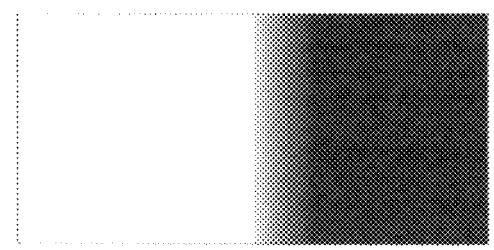
FIG. 3B is a sample image with gradual intensity transition along an edge line.
Figure 3C:
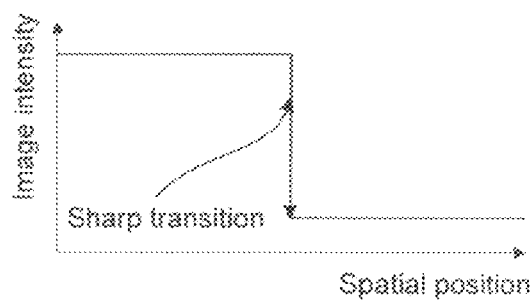
FIG. 3C illustrates the sharp intensity transition of the image shown in FIG. 3A.
Figure 3D:
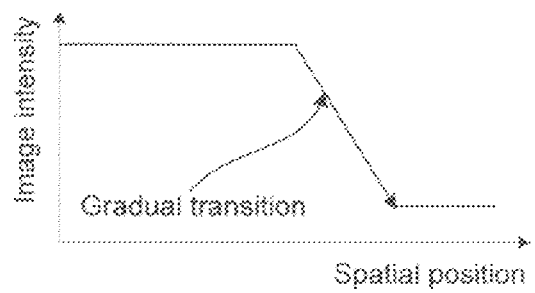
FIG. 3D illustrates the gradual intensity transition of the image shown in FIG. 3B.

Referring to FIGS. 1, 3A-3D, the acutance index calculation engine 52 of the console 50 fulfills the focus detection function of the present invention. It calculates image's acutance value and determines whether an image is in-focus based on the following principle: a focused image has the sharpest intensity transition along edge lines, as shown in FIGS. 3A and 3C. On the other hand, an unfocused image has a gradual intensity transition along edge lines, as shown in FIGS. 3B and 3D. In other words, a focused image has higher acutance value compared to an unfocused image.

In the present invention, instead of directly calculating the acutance value of an image, a frequency-domain index, "acutance index", is introduced. This index can be obtained by performing Fast Fourier Transform (FFT) operation, and the calculation can be done in several milliseconds. This enables a focusing lens to find its focus position at very high speed.

Figure 4:
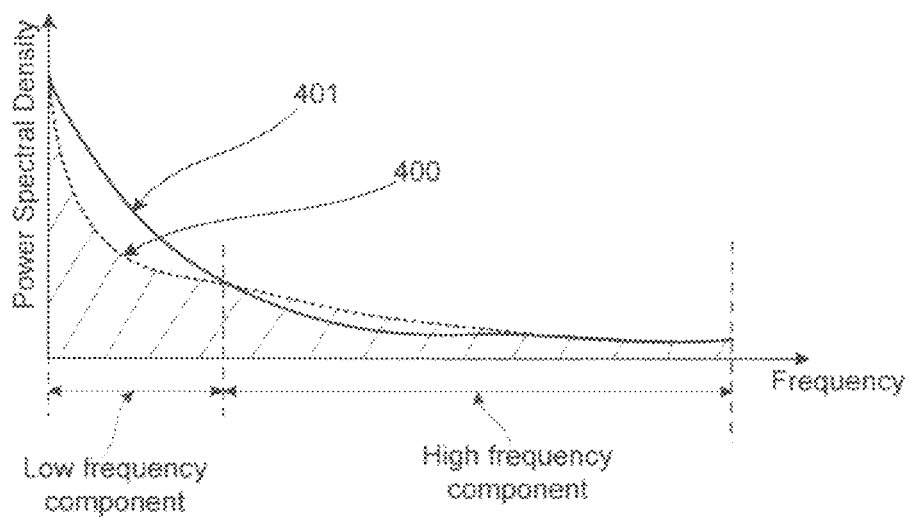
FIG. 4 shows the respective power spectral density distribution of images shown in FIGS. 3A and 3B.

Referring to FIG. 4, curve 400 is the corresponding power spectral density distribution of the sharpest intensity transition shown in FIG. 3C. And curve 401 is the corresponding power spectral density distribution of the gradual intensity transition shown in FIG. 3D. It is clear from FIG. 4 that the total power spectral density of the sharpest intensity transition (the area surrounded by curve 400, the horizontal axis and the vertical axis) is smaller than that of the gradual intensity transition (the area surrounded by curve 401, the horizontal axis and the vertical axis). Therefore, the total power density can be used as the acutance index.

Referring to FIG. 4, it is also clear that the low frequency component of the total power spectral density of the sharpest intensity transition is smaller than that of the gradual intensity transition. Therefore, the low frequency component of the total power spectral density can be used as another acutance index.

Referring to FIG. 4, it is also clear that the high frequency component of the total power spectral density of the sharpest intensity transition is larger than that of the gradual intensity transition. Therefore the ratio between low frequency component and high frequency component can be used as the third acutance index.

Figure 5A:
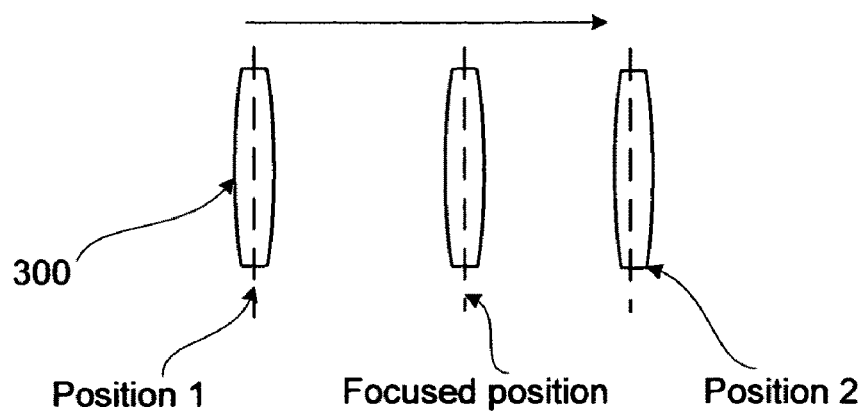
FIG. 5A shows an examplary movement of a focusing lens.
Figure 5B:
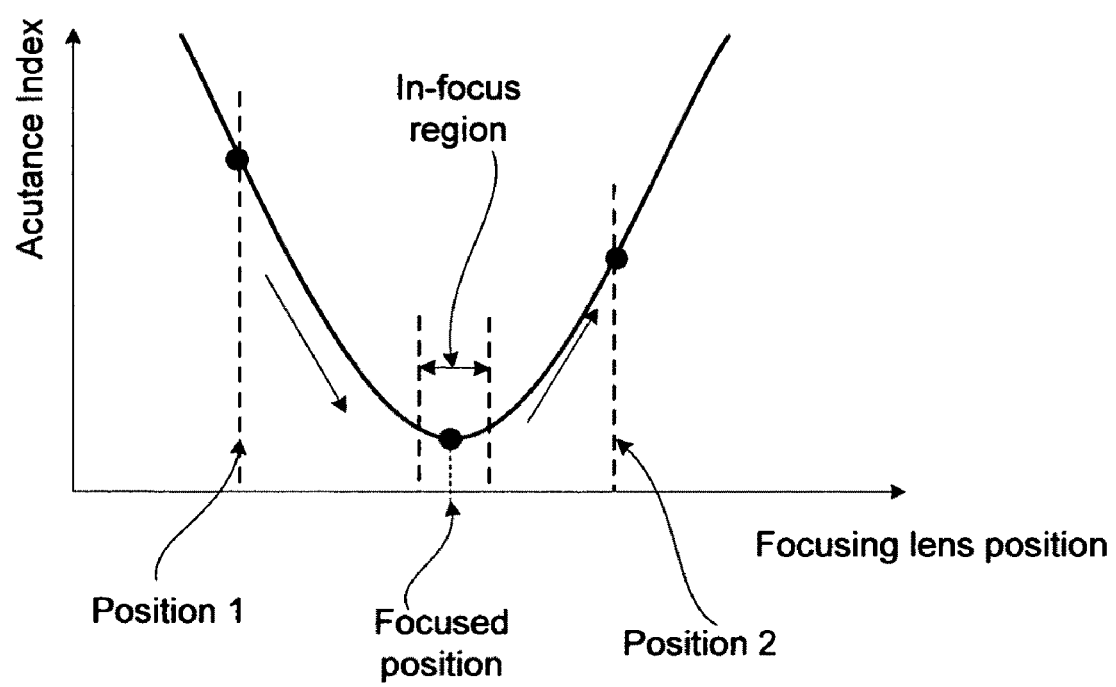
FIG. 5B illustrates the acutance index change corresponding to the lens position change.

Referring to FIGS. 1, 5A and 5B, according to the principle described above, when the focusing lens 300 of the image capturing optical unit 30 starts from position 1, moving toward the focused position, stopping at position 2, the acutance indices of the images at corresponding positions follow the trajectory illustrated in FIG. 5B. At the focused position, the acutance index has the lowest value.

Referring to FIG. 1, the motion control engine 53 of the control console 50 gives instructions to the motion controller 60 based on the output of the acutance index calculation engine 52. And the motion controller 60 in return controls the motion of the lens driving unit 70 until the focusing lens inside the image capturing optical unit 30 finds its focused position.

Referring to FIG. 1, the control console 50 controls the auto focus system 10 via the tool control software. Besides performing functions described above, it also initializes the image and data acquisition timing, as well as performs other essential functions to complete the auto focus operation.

Figure 6:
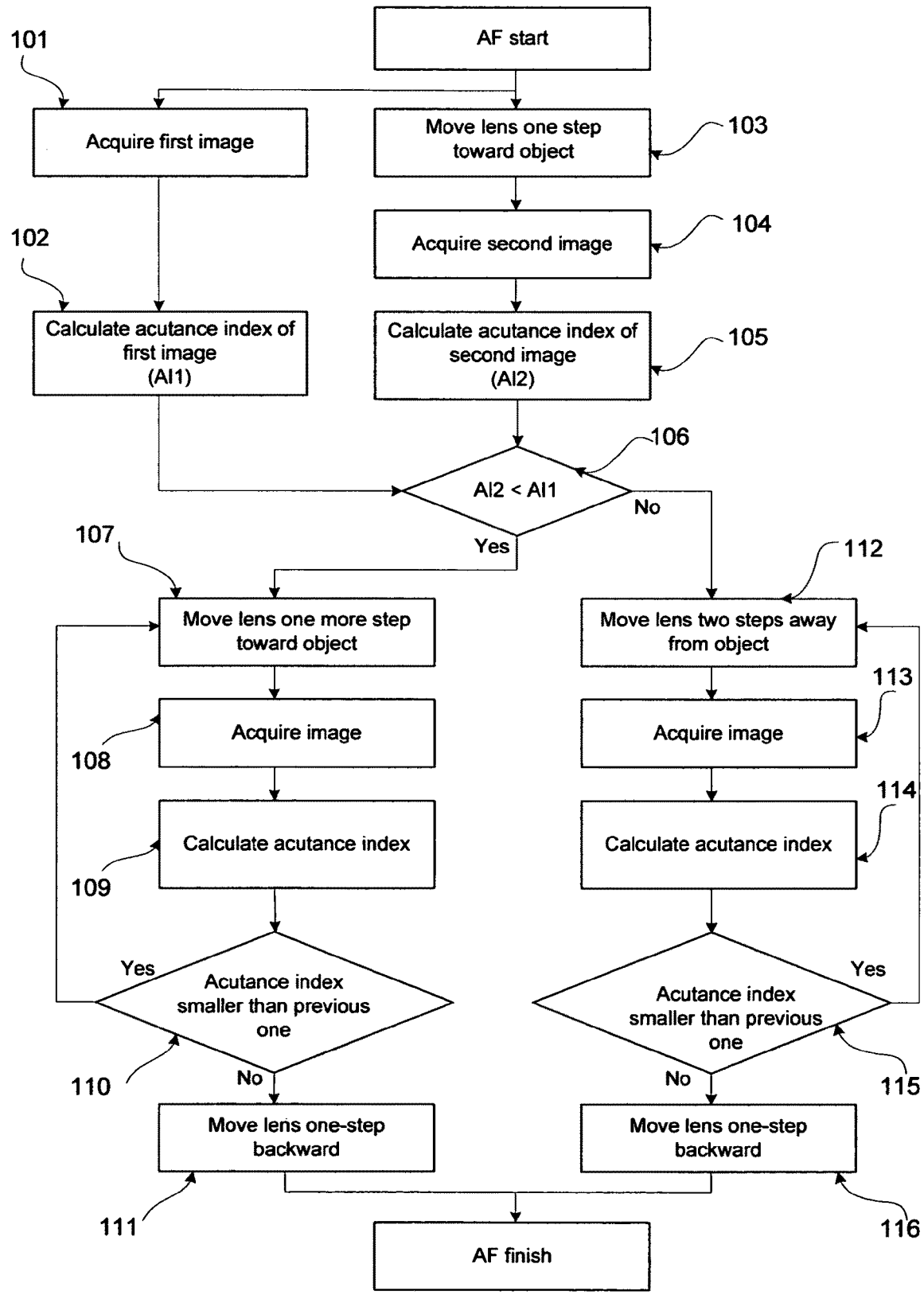
FIG. 6 is a flow chart demonstrating the operational procedure of one of the embodiments of the auto focus system of the present disclosure.

FIG. 6 illustrates the operational procedure of one embodiment of the auto focus system 10 of the present disclosure. In this case, the focusing lens inside the image capturing optical unit 20 is movable relative to other optical components. It is moved forward and backward along the optical axis by the lens driving unit 70.

Referring to FIGS. 1 and 6, At start, since the auto focus system 10 does not know whether the current focal point is in front of or behind the object 20, it does not know which direction to move the focusing lens: toward or away from the object 20. To determine the moving direction, before moving the focusing lens, in Step 101, the auto focus system 10 acquires the first image of the object 20. In Step 102, the image acquisition and processing engine 51 processes the first image following the steps shown in FIG. 2, and the acutance index calculation engine 52 calculates the acutance index of the first image. At the same time, in Step 103 the lens driving unit 70 moves the focusing lens one-step toward the object 20. In Step 104, the image acquisition and processing engine 51 acquires and processes the second image. In Step 105, the acutance index calculation engine 52 calculates the acutance index of the second image. In Step 106, the motion control engine 53 compares the acutance indices of the first and second images. If the acutance index of the second image is smaller than that of the first image, in Step 107 the motion control engine 53 controls the lens driving unit 70 via the motion controller 60 to moves the focusing lens one more step toward the object 20. In Step 108 the image acquisition and processing engine 51 acquires and processes another image. In Step 109, the acutance index calculation engine 52 calculates the acutance index of the new image. In Step 110, the motion control engine 53 compares the acutance index of the new image with that of the previous image. If the acutance index of the new image is smaller than that of the previous image, the motion control engine 53 controls the lens driving unit 70 via the motion controller 60 to moves the focusing lens one more step toward the object 20. The Steps 107 through 110 will be repeated until the motion control engine 53 find an image whose acutance index is larger than that of the previous image. This indicates that the focusing lens passed over the best focus position. In Step 111, the motion control engine 53 controls the lens driving unit 70 via the motion controller 60 to moves the focusing lens one step away from the object 20. At this point, the focusing lens finds its best focus position, and the auto focus operation is completed.

On the other hand, In Step 106 if the motion control engine 53 finds the acutance index of the second image is larger than that of the first image, in Step 112 the motion control engine 53 controls the lens driving unit 70 via the motion controller 60 to moves the focusing lens two steps away from the object 20. In Step 113 the image acquisition and processing engine 51 acquires and processes another image. In Step 114, the acutance index calculation engine 52 calculates the acutance index of the new image. In Step 115, the motion control engine 53 compares the acutance index of the new image with that of the previous image. If the acutance index of the new image is smaller than that of the previous image, the motion control engine 53 controls the lens driving unit 70 via the motion controller 60 to moves the focusing lens one more step away from the object 20. The Steps 112 through 115 will be repeated until the motion control engine 53 find an image whose acutance index is larger than that of the previous image. This indicates that the focusing lens passed over the best focus position. In Step 116, the motion control engine 53 controls the lens driving unit 70 via the motion controller 60 to moves the focusing lens one step toward the object 20. At this point, the focusing lens finds its best focus position, and the auto focus operation is completed.

Figure 7:
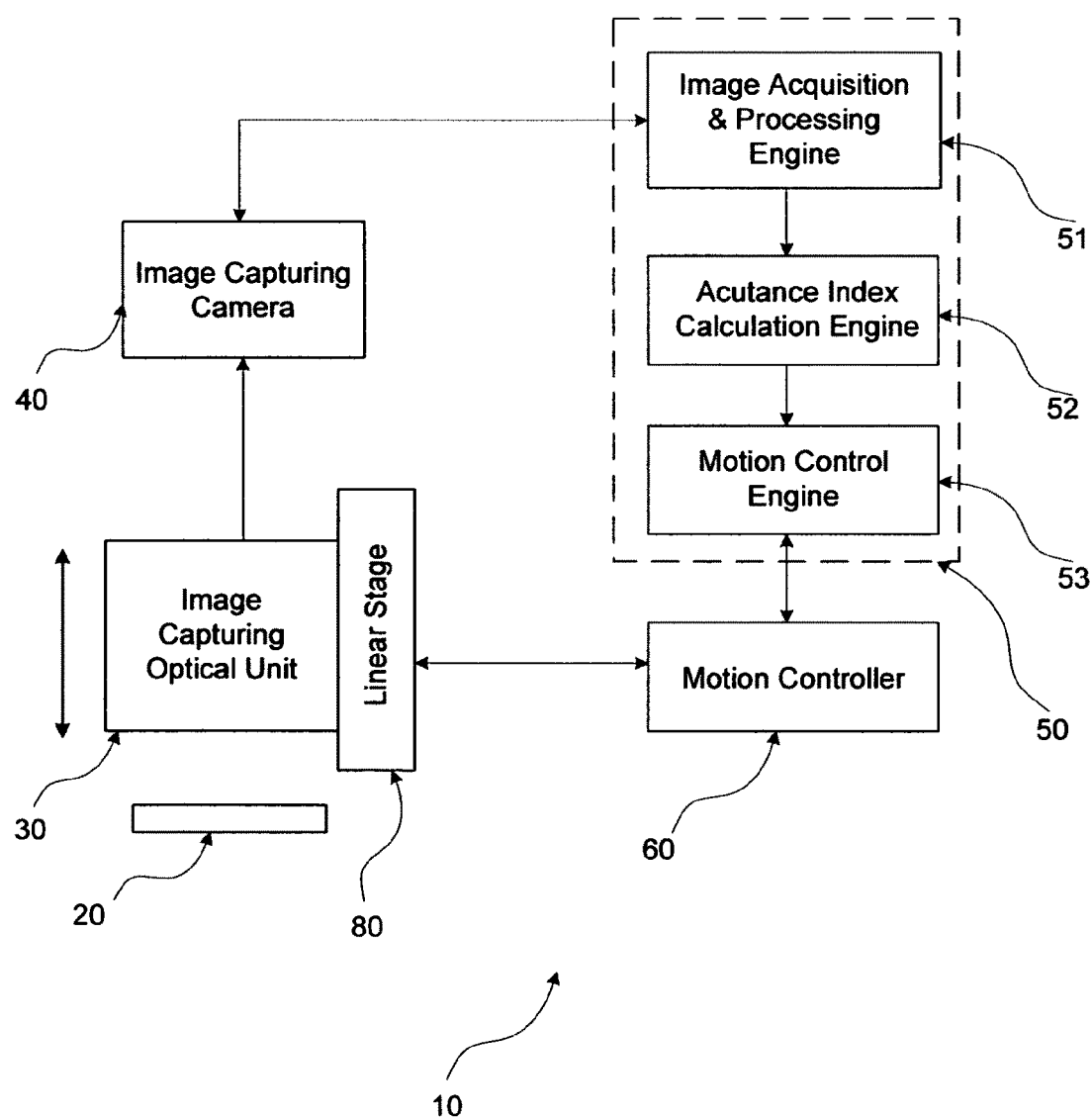
FIG. 7 shows another embodiment of the auto focus system of the present disclosure.

FIG. 7 illustrates the second embodiment of the present disclosure. In this case, the focusing lens is stationary relative to other optical components of the image capturing optical unit 30. The whole image capturing optical unit 30 is mounted on a motorized linear stage 80 and moved relative to the object 20 along the principal optical axis. The auto focus is achieved by automatically adjust the distance between the image capturing optical unit 30 and the object 20 based on image's acutance index.

The operation of this second embodiment of the system 10 is substantially the same as steps shown in FIG. 6.

What is claimed is:
1. An auto focus system consists of an Image acquisition and processing engine, and an acutance index calculation engine, Wherein the Image acquisition and processing engine performs the following image processing operations:
converting pixel data format to bitmap data format;
separating the RGB pixel value into individual red, green and blue pixel values;
generating grayscale image data based on the individual red, green and blue pixel values using programmable coefficients;

adjusting the intensity of the grayscale images within a user-defined range; and generating a ROI image for the acutance index calculation engine.

2. The system of claim 1, wherein the acutance index calculation engine uses the total power spectral density of a ROI image as the acutance index to perform focus detection.

3. The system of claim 1, wherein the acutance index calculation engine uses the low frequency component of the total power spectral density of a ROI image as the acutance index to perform focus detection.

4. The system of claim 1, wherein the acutance index calculation engine uses the ratio of low frequency component and high frequency component of the total power spectral density of a ROI image as the acutance index to perform focus detection.

5. The system of claims 1, 2, 3 and 4, wherein the acutance index is obtained by applying Fast Fourier Transform (FFT) operation on a ROI image.

6. The system of claims 1, 2, 3 and 4, wherein the acutance index is obtained by applying Discrete Fourier Transform (DFT) operation on a ROI images.

7. The The system of claims 1, wherein the auto focus system determines the lens's focused position by searching for the lowest acutance index value.

* * * * *